(12) United States Patent
McGeehin et al.

(10) Patent No.: US 8,029,659 B2
(45) Date of Patent: Oct. 4, 2011

(54) WRITE ELEMENT MODIFICATION CONTROL USING A GALVANIC COUPLE

(75) Inventors: Peter K. McGeehin, Derry (GB); GE Yi, Derry (GB); Andrew B. McInroy, Derry (GB); Brendan Lafferty, Muff (IE)

(73) Assignee: Seagate Techology LLC, Cupertino, CA (US)

( * ) Notice: Subject to any disclaimer, the term of this patent is extended or adjusted under 35 U.S.C. 154(b) by 1110 days.

(21) Appl. No.: 11/880,024

(22) Filed: Jul. 19, 2007

(65) Prior Publication Data

US 2009/0020432 A1    Jan. 22, 2009

(51) Int. Cl.
*C25D 11/00* (2006.01)
(52) U.S. Cl. .................... 205/86; 205/333; 205/657
(58) Field of Classification Search ............ 205/86
See application file for complete search history.

(56) References Cited

U.S. PATENT DOCUMENTS

| 3,488,222 | A | 1/1970 | Goldberg et al. |
| 4,536,992 | A * | 8/1985 | Hennenfent et al. .......... 451/259 |
| 4,850,157 | A * | 7/1989 | Holmstrand .................. 451/278 |
| 6,007,695 | A * | 12/1999 | Knall et al. .................... 205/657 |
| 6,219,200 | B1 * | 4/2001 | Waki et al. ............... 360/125.01 |
| 6,893,328 | B2 | 5/2005 | So |
| 6,979,389 | B2 | 12/2005 | Hao et al. |
| 7,084,064 | B2 | 8/2006 | Liu et al. |
| 7,123,447 | B2 | 10/2006 | Pendray et al. |
| 7,123,448 | B1 | 10/2006 | Boutaghou et al. |
| 7,126,792 | B2 | 10/2006 | Bonin et al. |
| 7,147,539 | B1 | 12/2006 | Hao et al. |
| 2004/0011462 | A1 * | 1/2004 | Gotkis et al. ............. 156/345.13 |
| 2008/0041725 | A1 * | 2/2008 | Klein et al. .................... 204/640 |

* cited by examiner

*Primary Examiner* — Harry D Wilkins, III
*Assistant Examiner* — Bryan D. Ripa
(74) *Attorney, Agent, or Firm* — David Fairbain

(57) ABSTRACT

A modification rate at a surface of an anode formed on a substrate is controlled. The anode is connected to a cathode comprised of a material having a higher nobility than the anode. An electrically conductive path is established between the anode and the cathode through an electrolyte to induce formation of an oxide layer at the anode surface that is more resistive to modification than the anode.

20 Claims, 3 Drawing Sheets

WRITE ELEMENT MODIFICATION CONTROL USING A GALVANIC COUPLE

BACKGROUND

The present invention relates to the fabrication of magnetic devices. More particularly, the present invention relates to controlling the rate of modification of a write element tip using a galvanic couple.

In a magnetic data storage and retrieval system, a thin-film transducing head typically includes a transducer, a substrate upon which the transducer is built, and an overcoat deposited over the transducer. The transducer, which is formed of multiple patterned layers successively stacked on the substrate, typically includes a writer portion for recording and storing magnetically-encoded information on a magnetic medium and a reader portion for retrieving the magnetically-encoded information from the magnetic medium. The volume of the transducer is typically much smaller than the volume of the substrate.

The layers of the transducer, which include both metallic and insulating layers, have differing mechanical and chemical properties than the overcoat. These differences in properties may cause the layers of the transducing head to be lapped or polished at different rates. Thus, when the medium confronting surface of the transducing head is lapped during its fabrication, differing amounts of the layers may be removed, resulting in an uneven medium confronting surface. For example, a greater amount of the metallic layers of the transducer may be removed during the lapping process than of the substrate material. This may result in pole tip recession (PTR), in which the medium confronting surface of the write element or pole is recessed from the medium confronting surface of the substrate.

SUMMARY

The present invention relates to controlling a modification rate at a surface of an anode formed on a substrate. The anode is connected to a cathode comprised of a material having a higher nobility than the anode. An electrically conductive path is established between the anode and the cathode through an electrolyte to induce formation of an oxide layer at the anode surface that is more resistive to modification than the anode.

DETAILED DESCRIPTION

Figure 1:
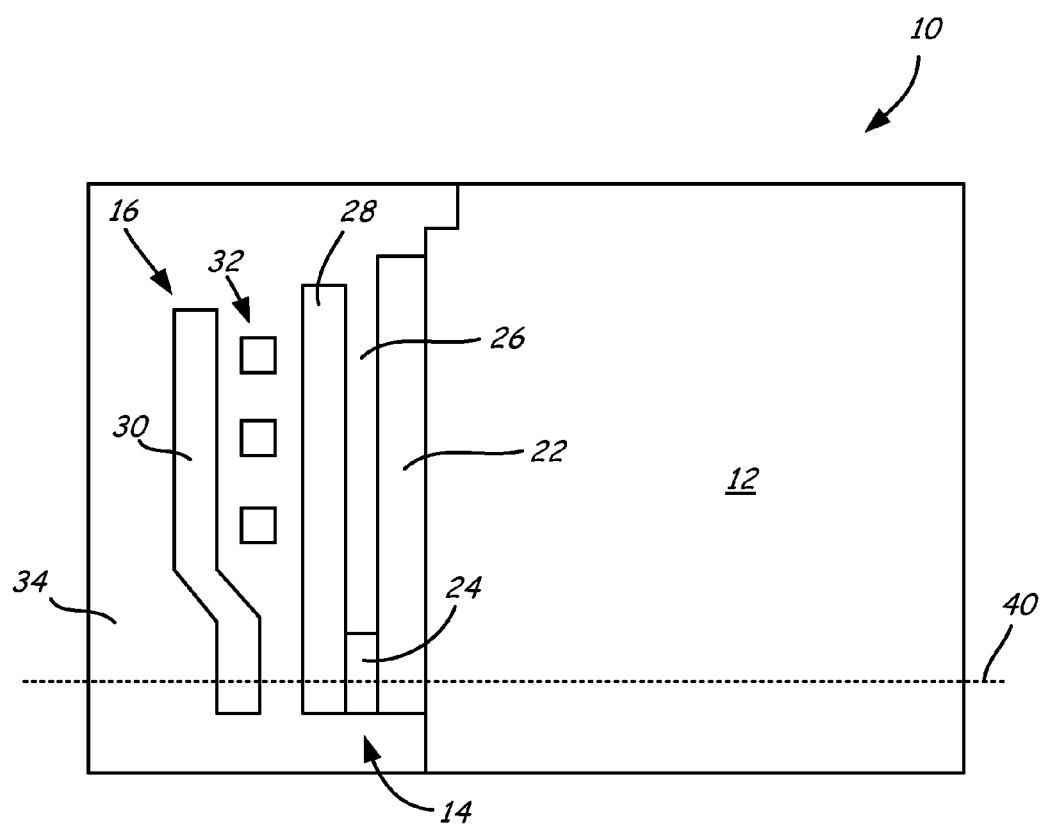
FIG. 1 is a cross-section view of a transducing head prior to processing to define the medium confronting surface.

FIG. 1 is cross-section view of a transducing head 10, which includes slider body 12, reader 14, and writer 16. Reader 14 includes bottom shield structure 22, read element 24, read gap 26, and top shield structure/return pole 28. Writer 16 includes top shield structure/return pole 28, write pole 30, conductive coil 32, and insulating layer 34. Reader 14 and writer 16 of transducing head 10 are merely exemplary structures shown for contextual purposes. Transducing head 10 may also include additional layers such as a basecoat and additional insulating layers.

Transducing head 10 confronts a magnetic medium at medium confronting surface 40. FIG. 1 shows transducing head 10 after fabrication but prior to definition of medium confronting surface 40. The process used to define medium confronting surface 40, and the technique employed to reduce recession of the tip of write pole 30 from medium confronting surface 40 during fabrication, will be described in more detail with regard to FIGS. 2A-2D.

Read gap 26 is defined on medium confronting surface 40 between terminating ends of bottom shield 22 and top shield 28. Read element 24 is positioned in read gap 26 adjacent medium confronting surface 40. Read gap 26 insulates read element 24 from bottom shield 22 and top shield 28. Read element 24 may be any variety of different types of read elements, such as a tunneling magnetoresistive (TMR) read element or a giant magnetoresistive (GMR) read element. In operation, magnetic flux from a surface of the magnetic medium causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28 guide stray magnetic flux away from read element 24.

In writer 16, return pole 28 may be comprised of a soft magnetic material, such as NiFe, and write pole 30 may be comprised of a high moment elemental metal or metal alloy material having soft magnetic properties, such as CoFe. Conductive coil 32 passes through the gap between return pole 28 and write pole 30. In order to write data to a magnetic medium, current is caused to flow through conductive coil 32. The magnetomotive force in the coils causes magnetic flux to travel from write pole 30 through the magnetic medium. The direction of the write field at medium confronting surface 40 of write pole 30, which is related to the state of data written to the magnetic medium, is controllable based on the direction that the current flows through conductive coil 30.

Slider body 12 may be composed of an electrically conductive, ceramic substrate material, such as $Al_2O_3$-TiC, AlTiC, TiC, Si, SiC, $ZrO_2$, or other composite materials formed of combinations of these materials. Insulating layer 34, which encapsulates reader 14 and writer 16 after deposition of the layers comprising these portions, is comprised of an insulating material such as $Al_2O_3$, AlN, $SiO_2$, $Si_3N_4$, SiC, or $SiO_{0-2}N_{0-1.5}$. The material of insulating layer 34 is chosen to closely match the chemical and mechanical properties of the material of slider body 20. Generally, the material of insulating layer 34 is softer than the material comprising the layers of writer 16.

The difference in material hardness between insulating layer 34 and the layers of writer 16 may result in varying levels of material recession during processing of transducing head 10 to define medium confronting surface 40. FIGS. 2A, 2B, 2C, and 2D are top views of transducing head 10 configured to control the modification rate of write pole 30 to reduce the recession of write pole tip 55 from medium confronting surface 40 during processing. Write pole 30 is electrically connected to cathode 60 via conductive trace 62 distal from medium confronting surface 40. Cathode 60 may be comprised of an elemental metal or metal alloy having a higher nobility than the material comprising write pole 30. For example, cathode 60 may be comprised of PdNi and write pole 30 may be comprised of CoFe. Other materials suitable for the anodic structure of write pole 30 include Fe, Ni, Cu, Cr, Zr, Ta, Ti, W, Al, Be, Mg, and alloys thereof. Other materials suitable for cathode 60 include Ru, Rh, Pd, Pt, Os, Ir, and alloys thereof.

Figure 2A:
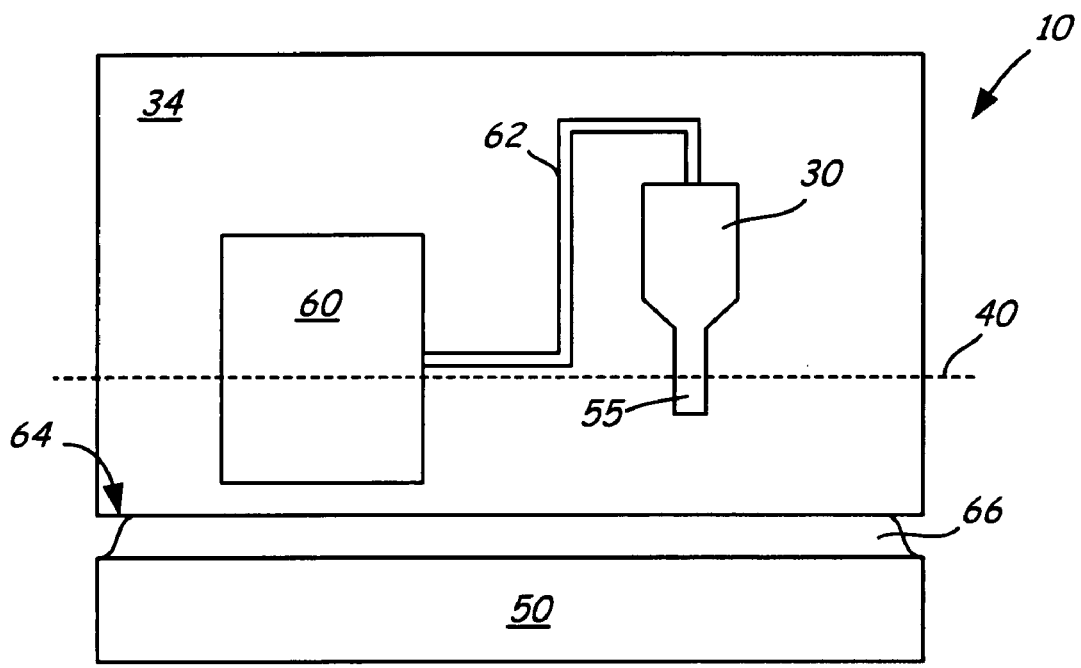
FIGS. 2A-2D are top views of the transducing head configured to control the modification rate of the write pole to reduce the recession of the write pole tip from the medium confronting surface during processing.

FIG. 2A shows profile affecting element 50 confronting surface 64 of transducing head 10. While a single transducing head 10 is shown being processed, it will be appreciated that a plurality of transducing heads 10 on a slider bar may be simultaneously processed by profile affecting element 50. Profile affecting element 50 may comprise any suitable lapping or polishing mechanism, such as a slurry process, a polishing plate using free abrasives such as alumina or diamond dust, or a polishing plate having an abrasive embedded in the plate. Profile affecting element 50 is urged against surface 64 and is operated to begin removing insulating material 34. A thin layer of electrolytic material 66 (dimensions exaggerated for illustration) is disposed between profile affecting element 50 and surface 64. Electrolytic material 66, which in some embodiments is an alkaline substance, may be provided through openings on profile affecting element 50 or may be dispensed onto the surface of profile affecting element 50 from another source.

Figure 2B:
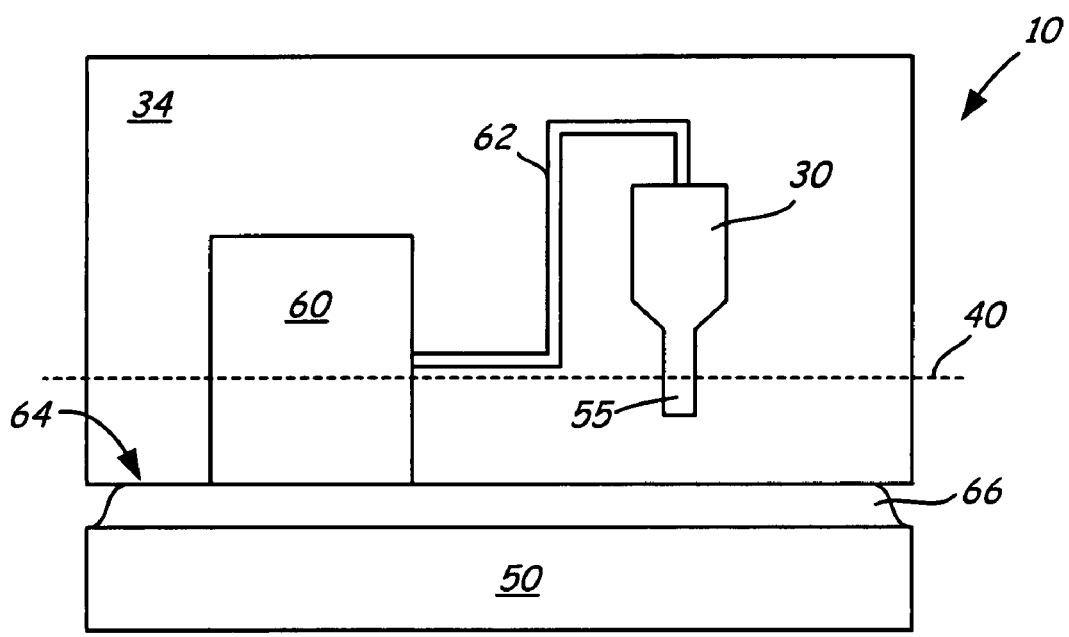

As profile affecting element 50 modifies transducing head 10 at surface 64, insulating layer 34 is removed until cathode 60 becomes exposed at surface 64. FIG. 2B is a top view of transducing head 10 after surface 64 is modified by profile affecting element 50 to expose cathode 60 at surface 64. When cathode 60 is exposed at surface 64, cathode 60 makes contact with electrolytic material 66.

Figure 2C:
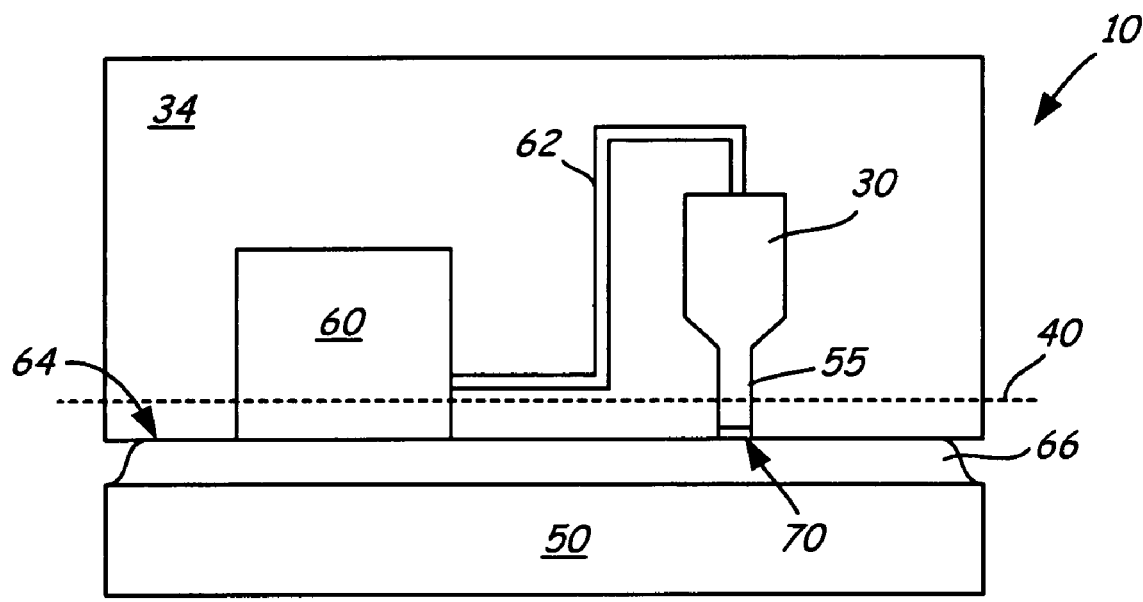

The modification of transducing head 10 at surface 64 continues substantially unchanged until profile affecting element 50 exposes write pole tip 55 at surface 64. FIG. 2C is a top view of transducing head 10 after surface 64 is modified by profile affecting element 50 to expose cathode 60 and write pole tip 55 at surface 64. This causes cathode 60 and write pole tip 55 to be in contact with electrolytic material 66. When this occurs, an electrically conductive path is formed between write pole 30, conductive trace 62, cathode 60, and electrolytic material 66. In this regard, write pole 30 functions as the anode of a galvanic cell.

Cathode 60 comprised of a higher nobility material pulls electrons from the less noble write pole 30. Positively charged ions are generated at write pole 30 at surface 64 of write pole tip 55, and the electrons pulled from write pole 30 causes cathode 30 to reduce ambient oxygen gas and water from electrolytic material 66 to form negatively charged ions in electrolytic material 66. The positively charged ions at write pole tip 55 react with the negatively charged ions from electrolytic material 66 to form protective layer 70 at the exposed surface of write pole tip 55.

For example, when write pole 30 is comprised of CoFe and cathode 60 is comprised of PdNi, the PdNi pulls electrons from the CoFe. This causes write pole 30 to generate ferrous ions ($Fe^{2+}$) at surface 64, and the electrons pulled from write pole 30 cause cathode 60 to form more hydroxide ions ($OH^-$) in electrolytic material 66, which may be an alkaline substance. The ferrous ions at surface 64 of write pole tip 55 react with the hydroxide ions in electrolytic material 66 to form $Fe_3O_4$ at the exposed surface of write pole tip 55. This forms a stable protective oxide layer on write pole tip 55.

When cathode 60 is comprised of a platinum group metal such as Ru, Rh, Pd, Pt, Os, Ir, or alloys thereof, the rate of the oxygen-reduction reaction between cathode 60 and write pole 30 increases. Platinum group metals facilitate easy adsorption of chemical reactants on their surface and easy desorption of chemical reaction products from their surface. In essence, platinum group metals lower the energy necessary to cause the oxygen-reduction reaction to occur. Consequently, oxygen is reduced at the cathode 60 at a faster rate, which allows faster oxidation of the write pole tip 55. This maintains the potential difference between anode 30 and cathode 60, which is the driving force of the galvanic couple. The result is an increased rate of oxide formation on the write pole tip 55, with the oxide being more resistant to mechanical abrasion than the underlying material.

Figure 2D:
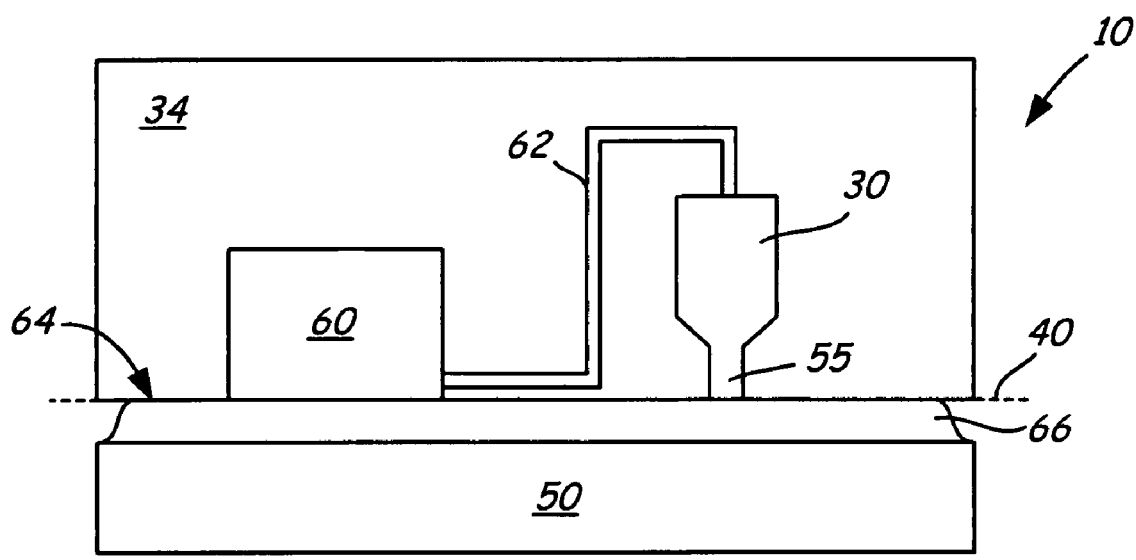

Transducing head 10 is modified by profile affecting element 50 until medium confronting surface 40 is defined. FIG. 2D is a top view of transducing head 10 after surface 64 is modified until medium confronting surface 40 is defined. Protective layer 70 reduces the modification rate of write pole tip 55 as transducing head 10 is modified, causing less material to be removed from write pole tip 55. Consequently, the recession of write pole tip 55 from medium confronting surface 40 is reduced compared to a write pole tip without protective layer 70 formed thereon. When fabrication of transducing head 10 is complete, conductive trace 62 may be broken to electrically disconnect write pole 30 from cathode 60.

The system described above is directed to slider level modification of write pole 30, but write pole 30 may also be modified at wafer level using a similar approach. For example, write pole 30 may be modified with chemical mechanical planarization (CMP) using the above technique, in a process that may be called galvanic CMP or g-CMP. To test wafer level modification, several wafers were processed including a write pole 30 comprised of CoFe electrically connected to a cathode 60 made of PdNi. Write pole 30 and cathode 60 were then covered in alumina. The wafers were polished by chemical mechanical planarization (CMP) at different pad pressures and using a particular alumina CMP slurry (i.e., electrolytic material) that showed enhanced rates of cathodic reaction on PdNi. For comparison, several transducing heads 10 were fabricated on the same wafer without cathode 60. For all heads 10, the polishing was continued well beyond exposure of write pole tip 55 to determine if write poles 30 connected to cathodes 60 were more resistant to polishing than write poles 30 not connected to cathodes 60. The polishing was done at lower pad pressures than pressures normally applied during head fabrication to give less abrasion and accentuate the effect of oxidization on write pole tip 55. High magnification imaging showed that each write pole 30 connected to a cathode 60 had less material removed (about 10% less) than the nearest neighboring write pole 30 not connected to a cathode 60. Write pole tip 55 was flush with or slightly protruding from medium confronting surface 40 in nearly all cases.

In summary, the present invention relates to controlling a modification rate at a surface of an anode formed on a substrate. The anode is connected to a cathode comprised of a material having a higher nobility than the anode. An electrically conductive path is established between the anode and the cathode through an electrolyte to induce oxidation of the anode at the surface. In some embodiments, the anode is comprised of Fe, Ni, Cu, Cr, Zr, Ta, Ti, W, Al, Be, Mg, and alloys thereof, and the cathode is comprised of Ru, Rh, Pd, Pt, Os, Ir, and alloys thereof. In magnetic recording device fabrication, connecting a cathodic pad to an anodic write element or pole results in the formation of a stable oxide at a high rate on the write element tip. The modification rate of the write element may be influenced by the oxidation of the write element tip to control pole tip recession during fabrication.

Although the present invention has been described with reference to preferred embodiments, workers skilled in the art will recognize that changes may be made in form and detail without departing from the spirit and scope of the invention.

The invention claimed is:

1. A method for controlling a modification rate of a device at an anode surface, the method comprising:

connecting the anode to a cathode, wherein the cathode is comprised of a material having a higher nobility than the anode; and establishing an electrically conductive path between the anode and the cathode through an electrolyte to induce formation of an oxide layer at the anode surface that is more resistive to modification than the anode, wherein the anode comprises a magnetic write element, and wherein the magnetic write element is surrounded by insulating material.

2. The method of claim 1, wherein establishing an electrically conductive path between the anode and the cathode comprises:

modifying the device until the anode and cathode are exposed to the electrolyte.

3. The method of claim 2, wherein modifying the device comprises polishing or lapping the device.

4. The method of claim 1, wherein the anode and cathode are connected distal from the anode surface.

5. The method of claim 1, wherein the anode and the cathode are each comprised of an elemental metal or a metal alloy.

6. The method of claim 1, wherein the anode is comprised of a material selected from the group consisting of Fe, Ni, Cu, Cr, Zr, Ta, Ti, W, Al, Be, Mg, and alloys thereof, and the cathode is comprised of a material selected from the group consisting of Ru, Rh, Pd, Pt, Os, Ir, and alloys thereof.

7. A method comprising:

forming an anode including an anode surface;

connecting the anode to a cathode comprised of a material having a higher nobility than the anode; and modifying the anode at the anode surface with a profile affecting element, wherein, when an electrically conductive path is established between the anode and cathode through an electrolyte, oxidation of the anode is induced at the surface to change a modification rate of the anode by the profile affecting element, wherein oxidation of the anode forms an oxide layer at the anode surface that is more resistive to material removal than the anode.

8. The method of claim 7, wherein the anode and cathode are connected distal from the anode surface.

9. The method of claim 7, wherein the anode and the cathode are each comprised of an elemental metal or a metal alloy.

10. The method of claim 7, wherein the anode is comprised of a material selected from the group consisting of Fe, Ni, Cu, Cr, Zr, Ta, Ti, W, Al, Be, Mg, and alloys thereof, and the cathode is comprised of a material selected from the group consisting of Ru, Rh, Pd, Pt, Os, Ir, and alloys thereof.

11. A method for fabricating a write element, the method comprising:

forming the write element including an exterior surface;

connecting the write element to a cathode comprised of a material having a higher nobility than the write element;

modifying the write element at the exterior surface; and inducing oxidation of the write element at the exterior surface to change a modification rate of the write element.

12. The method of claim 11, wherein inducing oxidation of the write element at the exterior surface comprises forming an oxide layer at the exterior surface that is more resistive to material removal than the write element.

13. The method of claim 11, wherein inducing oxidation of the write element at the surface comprises:

establishing an electrically conductive path between the write element and the cathode through an electrolyte.

14. The method of claim 11, wherein the write element and cathode are connected distal from the surface.

15. The method of claim 11, wherein the write element and the cathode are each comprised of an elemental metal or a metal alloy.

16. The method of claim 11, wherein the anode is comprised of a material selected from the group consisting of Fe, Ni, Cu, Cr, Zr, Ta, Ti, W, Al, Be, Mg, and alloys thereof, and the cathode is comprised of a material selected from the group consisting of Ru, Rh, Pd, Pt, Os, Ir, and alloys thereof.

17. The method of claim 11, and further comprising:

disconnecting the cathode from the write element after modification of the write element.

18. A method comprising:

forming an anode including an anode surface, wherein the anode comprises a magnetic write element;

connecting the anode to a cathode comprised of a material having a higher nobility than the anode; and modifying the anode at the anode surface with a profile affecting element, wherein, when an electrically conductive path is established between the anode and cathode through an electrolyte, oxidation of the anode is induced at the surface to change a modification rate of the anode by the profile affecting element.

19. The method of claim 18, wherein the anode is comprised of a material selected from the group consisting of Fe, Ni, Cu, Cr, Zr, Ta, Ti, W, Al, Be, Mg, and alloys thereof, and the cathode is comprised of a material selected from the group consisting of Ru, Rh, Pd, Pt, Os, Ir, and alloys thereof.

20. The method of claim 18, wherein the magnetic write element is surrounded by insulating material.

* * * * *